(12) United States Patent
Brown et al.

(10) Patent No.: US 8,621,420 B2
(45) Date of Patent: Dec. 31, 2013

(54) MODELING USER PERCEIVED USE CASE AFFINITY

(75) Inventors: Carolyn A. Brown, Austin, TX (US); Robert C. Johnson, Jr., Pescadero, CA (US); David R. Schwartz, Bellevue, WA (US); David C. Vogele, Oceano, CA (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/958,660

(22) Filed: Dec. 18, 2007

(65) Prior Publication Data

US 2009/0158245 A1 Jun. 18, 2009

(51) Int. Cl.
*G06F 9/44* (2006.01)

(52) U.S. Cl.
USPC .......................................................... 717/104

(58) Field of Classification Search
USPC ................................................ 717/104, 105
See application file for complete search history.

(56) References Cited

U.S. PATENT DOCUMENTS

| | | | |
|---|---|---|---|
| 6,983,331 B1* | 1/2006 | Mitchell et al. | 709/246 |
| 7,080,355 B2 | 7/2006 | Carlson et al. | |
| 7,149,734 B2 | 12/2006 | Carlson et al. | |
| 7,162,708 B2 | 1/2007 | Cho et al. | |
| 2002/0129346 A1 | 9/2002 | Lee et al. | |
| 2003/0126583 A1* | 7/2003 | Cho et al. | 717/104 |
| 2004/0193561 A1* | 9/2004 | Ohashi | 706/46 |
| 2006/0206760 A1 | 9/2006 | Oishi et al. | |

OTHER PUBLICATIONS

Phillips and Kemp, In Support of User Interface Design in the Rational Unified Process, Third Australian User Interface Conference (2002).*
Constantine, Larry L. "Essential Modeling: Use Cases for User Interfaces". Interactions vol. 2 Issue 2 pp. 34-46. 1995.
Hudson, Scott E. et al. "A Tool for Creating Predictive Performance Models from User Interface Demonstrations". UIST 1999, pp. 93-102. Asheville, NC.
Thomas, Dave & Barry, Brian M. "Model Driven Development—The Case for Domain Oriented Programming". OOPSLA, Oct. 26-30, 2003, pp. 2-7. Anaheim, California.
Zhang, Chengliang et al. "A Hierarchical Model of Data Locality". POPL, Jan. 11-13, 2006, pp. 16-29. Charleston, South Carolina.

* cited by examiner

*Primary Examiner* — Anna Deng
(74) *Attorney, Agent, or Firm* — Andrea Bauer; Hoffman Warnick LLC

(57) ABSTRACT

A system, method and program product for creating a UML model of a user interface environment, such as a website. A UML design system is disclosed that includes: a system for defining use cases within the UML model; a system for associating an affinity representing a user-perceived relationship between use cases within the UML model; and a system for assigning a weight to the affinity within the UML model.

10 Claims, 5 Drawing Sheets

FIG. 6

MODELING USER PERCEIVED USE CASE AFFINITY

FIELD OF THE INVENTION

This disclosure relates generally to unified modeling language (UML) designs, and more particularly relates to a system and method for creating affinities among use cases that represent user-perceived relationships among those use cases.

BACKGROUND OF THE INVENTION

Designing complex user experience systems, such as web domains, requires a significant amount of thought regarding what should appear on different web pages. One approach is to first model the system using, e.g., a unified modeling language (UML). UML allows an analyst to utilize graphical representations to define "use cases" that will allow user goals to be met. Use cases may comprise any interaction that a user might have with the system, e.g., request a quote, browse special offers, save to a file, etc. Once a UML use case model is completed, a user experience designer can design web pages that appropriately enable the interactions for the users.

However, user experience designers need to understand the relationships users perceive among use cases to design an experience that enables users to interact effectively with a complex system in a way that meets their expectations. For instance, when does it make sense to include or not include different use cases and use case choices on the same page? When a designer creates views of the system that users interact with, the views are composites, derived from multiple use cases, offering the user multiple possible actions that may include executing a primary use case (e.g., purchase this item) as well as initiating other related, but not necessarily integral, use cases (e.g., view related items). Unfortunately, current UML modeling practices do not support formal specification of these relationships. Thus, a completed UML model provides little guidance to the designer regarding relationships among use cases.

Although UML does provide for defining certain types of use case relationships in which use cases directly depend upon each other, i.e., "includes" and "extends," such relationships do not allow an analyst to formally establish associations among independent use cases, as described above. The "includes" relationship is used to indicate that as a natural part of executing one use case (A), another use case (B) is executed as a component of use case (A). The "extends" relationship describes a use case that adds unessential functionality to another use case. Accordingly, a need exists that will address shortcomings in the art.

SUMMARY OF THE INVENTION

The present invention relates to a system, method and program product that allows an analyst to associate affinities, representing user-perceived relationships, between use cases within a UML model. Also provided is the ability to assign a weight to each affinity within the UML model.

In one embodiment, there is a UML design system for creating a UML model of a user interface environment, comprising: a system for defining use cases within the UML model; a system for associating an affinity representing a user-perceived relationship between use cases within the UML model; and a system for assigning a weight to the affinity within the UML model.

In a second embodiment, there is a program product stored on computer readable medium for creating a UML model of a user interface environment, the program product comprising: program code for defining use cases within the UML model; program code for associating an affinity representing a user-perceived relationship between use cases within the UML model; and program code for assigning a weight to the affinity within the UML model.

In a third embodiment, there is a method for creating a UML model of a user interface environment, comprising: defining use cases within the UML model; associating an affinity representing a user-perceived relationship between use cases within the UML model; and assigning a weight to the affinity within the UML model.

In a fourth embodiment, there is a method for deploying a system for creating a UML model of a user interface environment, comprising: providing a computer infrastructure being operable to: define use cases within the UML model; associate an affinity representing a user-perceived relationship between use cases within the UML model; and assign a weight to the affinity within the UML model.

Knowing the relationships (i.e., affinities) users perceive among use cases allows a designer to utilize the UML model to achieve various results. First, knowing that there are affinities with other use cases allows the designer who is creating the visual (or aural or tactile) design of a use case to decide which other use cases should be available as choices for the user to execute. Second, the strength of the affinities allows for decisions about treatment: which actions are central to the target use case and, thus, its related view and which are more peripheral (those with weaker affinities). Those that are most peripheral which, because of limitations of the device that renders the view, may have to be relegated to a less obvious treatment (for example, a sub-menu of additional options).

Adding the construct of an affinity between use cases allows the designer to capture important information about the analyst's conceptual model of a system that is not formally captured by other UML conventions. Information about the conceptual model is an important input to the design process, enabling designers to create systems that are more efficient and usable by their intended users.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 6 depicts a webpage having use cases arranged in accordance with an embodiment of the present invention.

Figure 1:
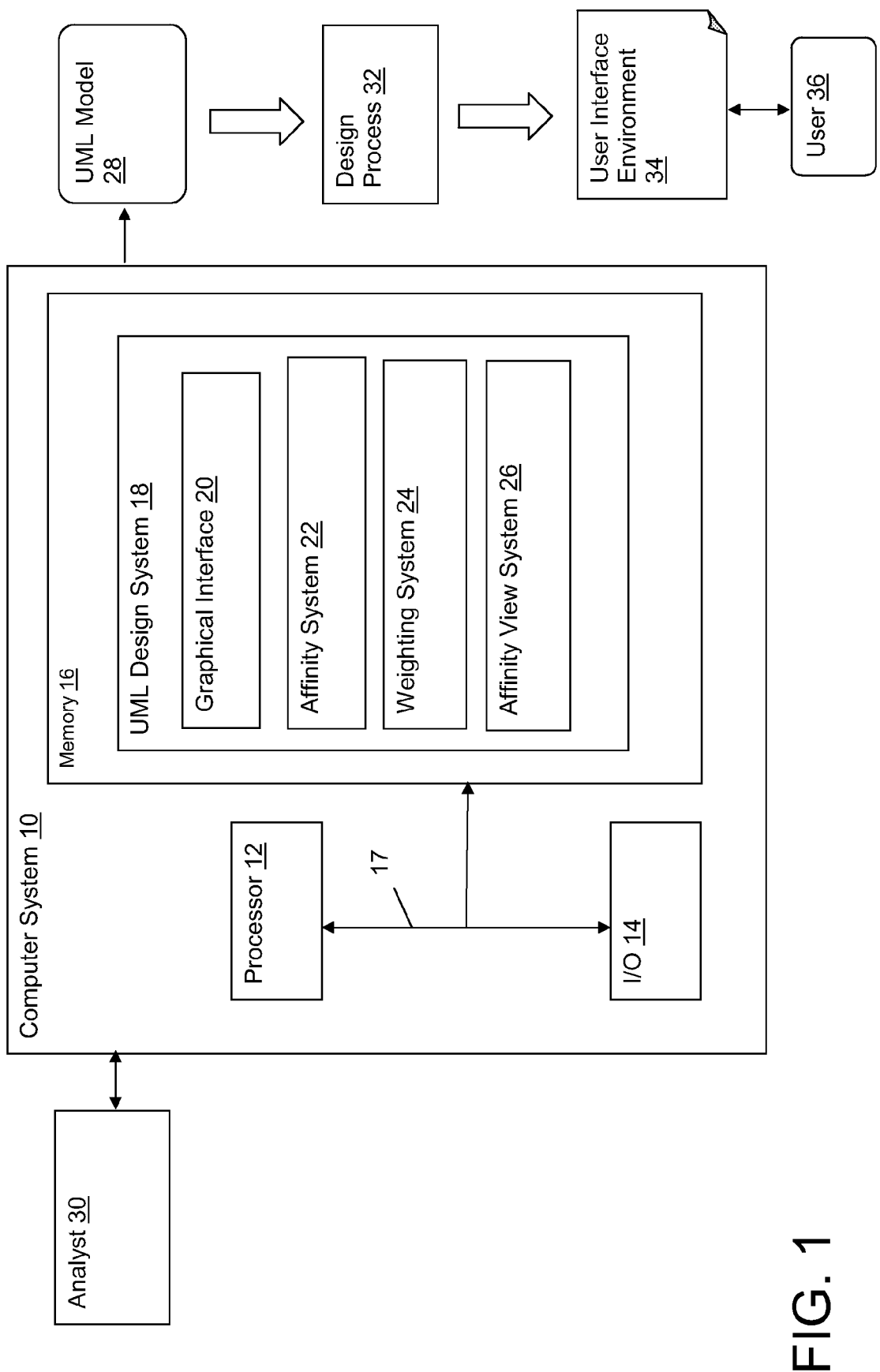
FIG. 1 depicts a computer system having a UML design system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to the drawings, FIG. 1 depicts a computer system 10 having a unified modeling language (UML) design system 18 that allows an analyst 30 to generate a UML model 28 of a user interface environment 34, such as a website or other visual, aural or tactile interactive platforms. Once created, a design process 32 is employed to create the user interface environment 34 from the UML model 28. As noted, UML model 28 utilizes use cases to represent points of interaction within the user interface environment 34. UML design system 18 includes processes for creating associations, or affinities, amongst use cases. Note that for the purposes of the present invention, UML, which is technically defined by the Object Management Group, refers to any modeling language or system in which use cases or equivalents are used to model interactive systems.

UML design system 18 generally includes: a graphical interface 20 that allows analyst 30 to construct UML model 28; an affinity system 22 that allows the analyst 30 to establish an affinity between use cases; a weighting system 24 that allows an analyst 30 to assign a strength of the affinity of one use case for another (and vice versa); and an affinity view system 26 that provides affinity data that can be used to influence how the design process 32 will implement use cases in the user interface environment 34. An affinity essentially indicates a user-perceived relationship from one use case to another use case.

Note that in a typical application, the use cases being associated with affinities are independent of each other, that is, the execution of one does not directly influence the execution of the other. For example, a user interface environment 34 may provide the user 36 both the opportunity to complete a purchase of a selected item (continue the execution of a first use case) or shop for additional related items (execute a second use case). Given the relatedness of these use cases, the analyst 30 may determine that there is a relatively high affinity between the two.

Figure 2:
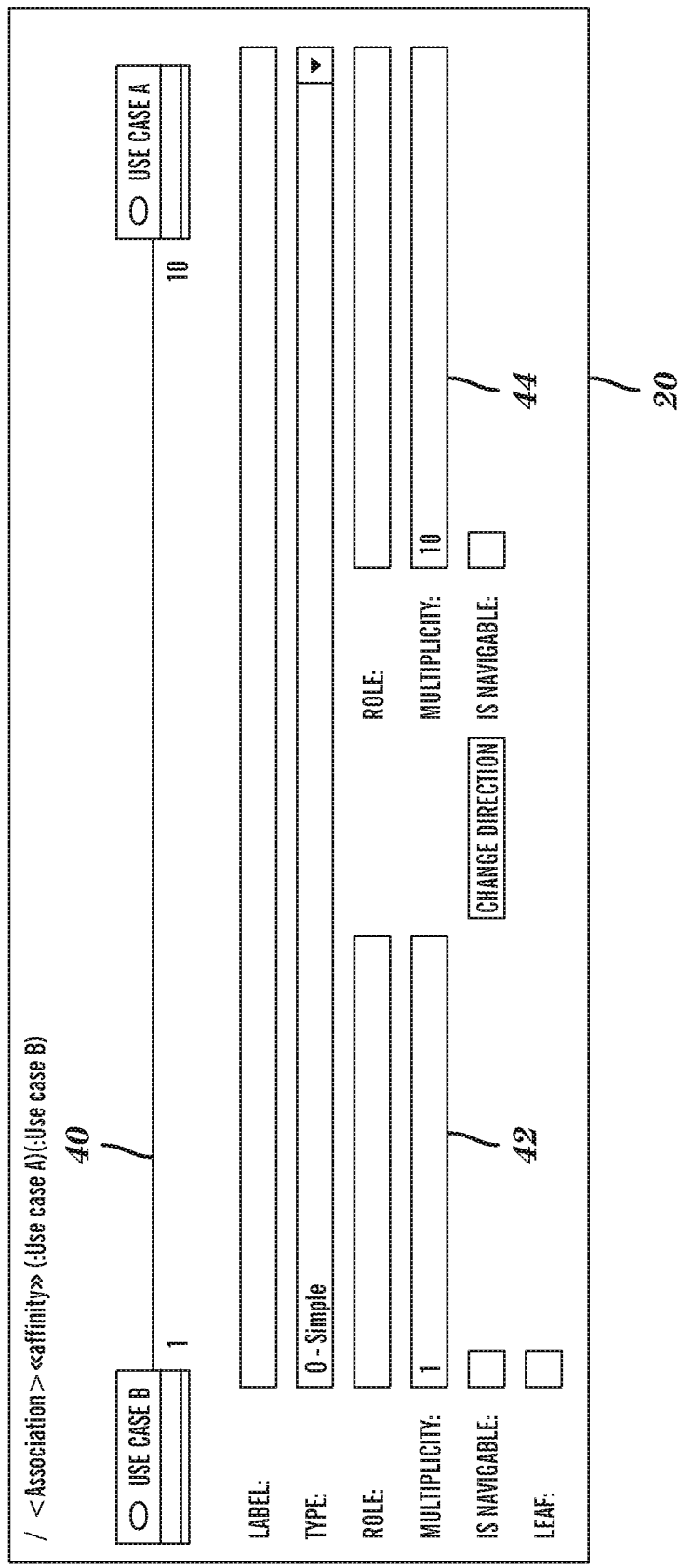
FIG. 2 depicts a UML interface in accordance with an embodiment of the present invention.

The implementation of a graphical interface 20 for creating UML models 30 is readily known in the art, and is therefore not described in significant detail. However, FIG. 2 depicts an illustrative graphical interface 20 utilized to display an affinity between Use case B and Use case A, and provide input fields for setting a weight (in this case a "multiplicity") 42 to the affinity 40. Note that the affinities are directional, i.e., a first weight 42 of "1" is applied from Use case A to Use case B, and a second weight 44 of "10" is applied from Use case B to Use case A. Note that weights can be determined in any manner, e.g., based on pre-existing scheme, arbitrarily by the analyst, by an automated process, etc.

In this example, a user 36 who is executing Use case A is likely to want to also execute Use case B with a strength of "10" units. If the project had chosen, for example, a 1 to 10 scale, with 1 being weakest and 10 being strongest, then Use case B would have a strongest possible affinity to Use case A (i.e., the target use case). One implication of Use case B having a high affinity to Use Case A is that the design process 32 (FIG. 1) should provide a choice to execute Use case B when Use case A is being executed. Use case B in this example would thus qualify as a good "affinity choice" for Use case A.

Figure 3:
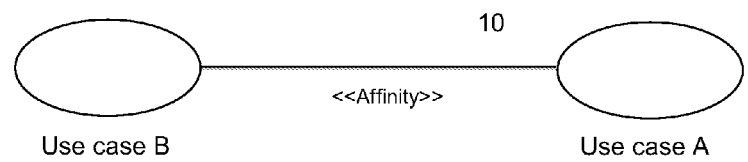
FIG. 3 depicts a pair of graphically represented use cases and associated affinity in accordance with an embodiment of the present invention.
Figure 4:
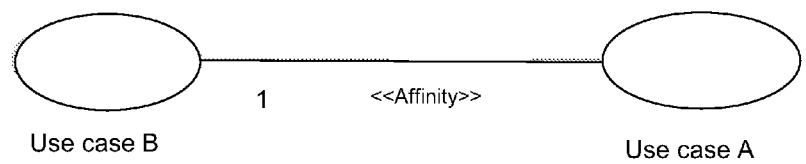
FIG. 4 depicts a pair of graphically represented use cases and associated affinity in accordance with an embodiment of the present invention.

As shown in FIGS. 3 and 4, while the affinity from Use case B to Use case A is a 10 (very high), the affinity from Use case A to Use case B is a 1 (very low). This thus indicates that when Use case B is displayed for execution, there is a low likelihood that the user would also want to be able to execute Use case A. In this case, Use case A would provide a very limited affinity choice of Use case B.

As noted, affinity view system 26 provides affinity data that can be used to influence how the design process 32 will implement use cases in the user interface environment 34. For example, each use case in the UML model 28 that the user 36 can choose to execute may have an "affinity view," which reflects its affinities with other use cases which, in turn, dictates or informs how an affinity choice should be presented. An affinity view may for example comprise a brief statement that describes how to include the textual and/or graphical choice to execute the use case when it is presented as an affinity choice. For example, if the use case "Request a proposal" was to be implemented as an affinity choice, the affinity view could be the title, or any other set of words that connote the goal achieved by this use case (e.g., "Send me a custom proposal").

Figure 5:
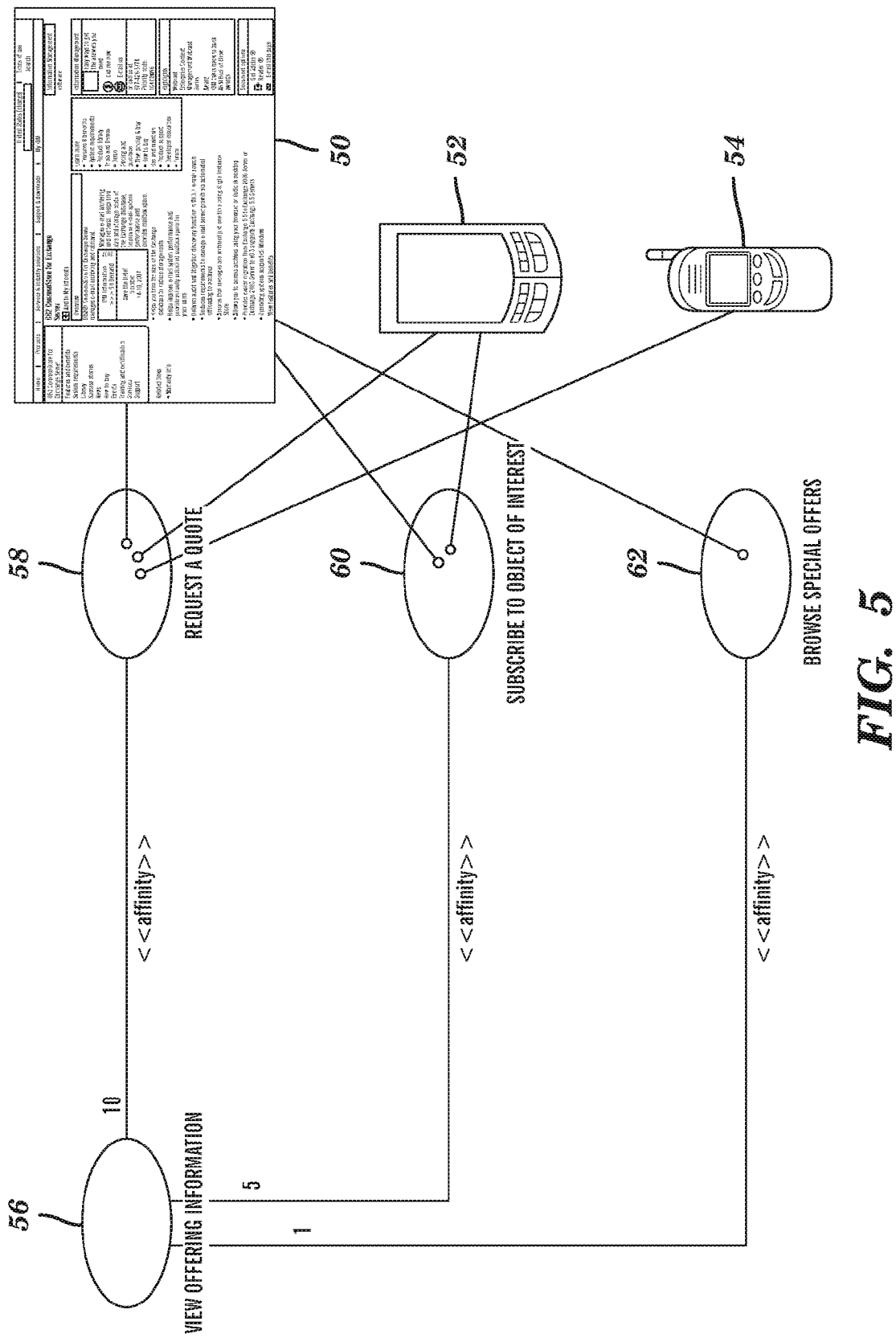
FIG. 5 depicts an overview of how affinity data can be used to control what affinity uses cases appear on different display types in accordance with an embodiment of the present invention.

In another example, affinity data may comprise relationships that determine whether an affinity choice should appear on a given type of display. FIG. 5 illustrates how the design of an experience on three different display devices 50, 52, and 54 would incorporate different numbers of the use cases depending on each device's capacity to present information simultaneously. In this example, a target use case "View offering information" includes three possible use case choices 58, 60, and 62. The desktop computer screen display 50 can present all three use case choices (58, 60, and 62) the PDA 52 can present two of them (58 and 60), and the cell phone 54 can present one of the use case choices (58) with an affinity to the target use case 56 due to their relative screen sizes.

Figure 6:
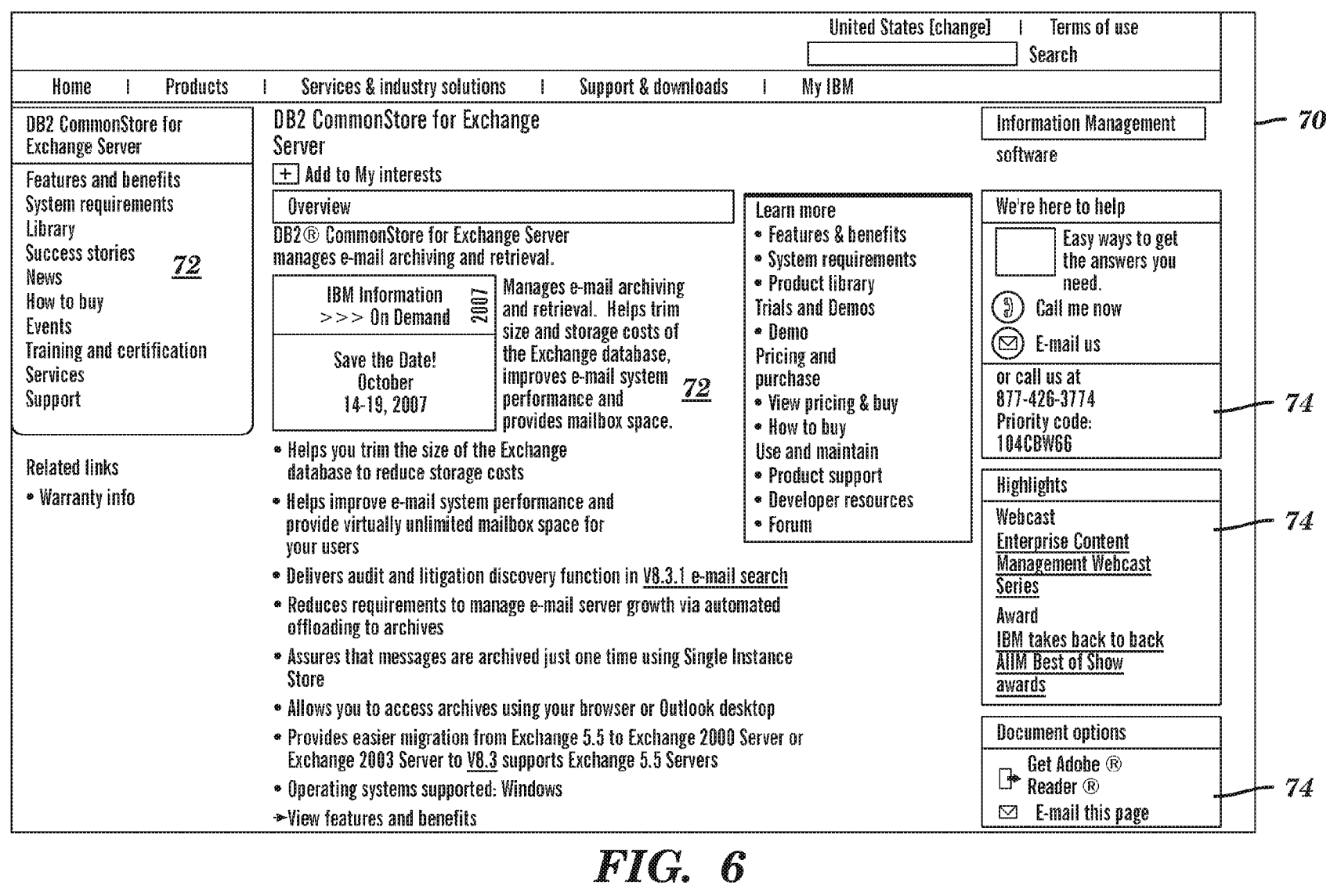

In a further example shown in FIG. 6, affinity data determines relative placement of use cases in a web page 70. While the central and most prominent parts of a display should support the use case 72 currently being executed, other, related use case 74 choices may appear at the periphery of the experience.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of computer readable medium, data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a UML design system 18 could be created, maintained and/or deployed by a service provider that offers the functions described herein for customers. That is, a service provider could offer to deploy or provide the ability to create UML models 28 as described above.

It is understood that in addition to being implemented as a system and method, the features may be provided as a program product stored on a computer-readable medium, which when executed, enables computer system 10 to provide a UML design system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A UML design system for creating a UML model of a user interface environment, comprising:
    at least one computer system, including:
        a system for defining use cases within the UML model, wherein the use cases are independent of each other;
        a system for associating an affinity representing a user-perceived relationship between use cases within the UML model, wherein the affinity is directional from an affinity use case to a target use case;
        a system for assigning a weight to the affinity within the UML model, wherein the system for assigning the weight assigns a first weight that dictates a strength of the affinity from a first use case to a second use case and assigns a second, separate weight that dictates a strength of the affinity from the second use case to the first use case;
        a system for incorporating affinity data into the UML model to influence use cases to be displayed in the user interface environment, wherein the affinity data includes assigned weights; and
        a system for determining whether the affinity use case should be appeared on a selected display type based on the affinity data.

2. The UML design system of claim 1, wherein the user interface environment enables multiple use cases and includes an environment selected from the group consisting of: a website, a visual interface, an aural interface, and a tactile interface.

3. The UML design system of claim 1, wherein the affinity data provides a title for a use case when the use case appears as an affinity use case for a target use case.

4. A program product stored in a non-transitory computer readable medium for creating a UML model of a user interface environment, the program product comprising program code for:
    defining use cases within the UML model, wherein the use case are independent of each other;
    associating an affinity representing a user-perceived relationship between use cases within the UML model, wherein the affinity is directional from an affinity use case to a target use case;
    assigning a weight to the affinity within the UML model, wherein the assigning the weight assigns a first weight that dictates a strength of the affinity from a first use case to a second use case and assigns a second, separate weight that dictates a strength of the affinity from the second use case to the first use case;

incorporating affinity data into the UML model to influence use cases to be displayed in the user interface environment, wherein the affinity data includes assigned weights; and determining whether the affinity use case should be appeared on a selected display type based on the affinity data.

5. The program product of claim 4, wherein the user interface environment enables multiple use cases and includes an environment selected from the group consisting of: a website, a visual interface, an aural interface, and a tactile interface.

6. The program product of claim 4, wherein the affinity data provides a title for a use case when the use case appears as an affinity use case for a target use case.

7. A computer-implemented method for creating a UML model of a user interface environment, comprising:
defining use cases within the UML model, wherein the use cases are independent of each other;
associating an affinity representing a user-perceived relationship between use cases within the UML model, wherein the affinity is directional from an affinity use case to a target use case;
assigning a weight to the affinity within the UML model, wherein the assigning the weight assigns a first weight that dictates a strength of the affinity from a first use case to a second use case and assigns a second, separate weight that dictates a strength of the affinity from the second use case to the first use case;
incorporate affinity data into the UML model to influence use cases to be displayed in the user interface environment, wherein the affinity data includes assigned weights; and
determine whether the affinity use case should be appeared on a selected display type based on the affinity data.

8. The computer-implemented method of claim 7, wherein the user interface environment enables multiple use cases and includes an environment selected from the group consisting of: a website, a visual interface, an aural interface, and a tactile interface.

9. The computer-implemented method of claim 7, wherein the affinity data provides a title for a use case when the use case appears as an affinity use case for a target use case.

10. A method for deploying a system for creating a UML model of a user interface environment, comprising:
providing a computer infrastructure being operable to:
define use cases within the UML model, wherein the use cases are independent of each other;
associate an affinity representing a user-perceived relationship between use cases within the UML model, wherein the affinity is directional from an affinity user case to a target use case;
assign a weight to the affinity within the UML model, wherein the assigning the weight assigns a first weight that dictates a strength or the affinity from a first use case to a second use case and assigns, a second, separate weight that dictates a strength of the affinity from the second use case to the first use case;
incorporate affinity data into the UML model to influence use cases to be displayed in the user interface environment, wherein the affinity data includes assigned weights; and
determine whether the affinity use case should be appeared on a selected display type based on the affinity data.

\* \* \* \* \*